United States Patent
Choi et al.

(10) Patent No.: US 9,436,060 B2
(45) Date of Patent: Sep. 6, 2016

(54) ISLANDS-IN-SEA TYPE PHOTOREFRACTIVE POLYMER COMPOSITE, AND PHOTOREFRACTIVE DEVICE AND OPTICAL DEVICE INCLUDING THE SAME

(71) Applicant: SAMSUNG ELECTRONICS CO., LTD., Suwon-si (KR)

(72) Inventors: Chil-sung Choi, Suwon-si (KR); Kyoung-seok Pyun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 14/011,077

(22) Filed: Aug. 27, 2013

(65) Prior Publication Data

US 2014/0253997 A1     Sep. 11, 2014

(30) Foreign Application Priority Data

Mar. 6, 2013 (KR) .................... 10-2013-0023944

(51) Int. Cl.
| | |
|---|---|
| *G02F 1/29* | (2006.01) |
| *G02F 1/00* | (2006.01) |
| *G02F 1/01* | (2006.01) |

(Continued)

(52) U.S. Cl.
CPC . *G02F 1/29* (2013.01); *G02B 1/04* (2013.01); *G02F 1/0126* (2013.01); *G02F 1/0338* (2013.01); *G02F 1/3511* (2013.01); *G02F 1/3611* (2013.01); *G02F 1/3612* (2013.01); *G02F 1/3613* (2013.01); *G02F 2203/52* (2013.01)

(58) Field of Classification Search
CPC .......................... G02B 27/09; G03H 2225/22
USPC ....... 359/315, 320–322, 324, 237, 242, 245, 359/251–255, 290–292, 295, 296, 298
See application file for complete search history.

(56) References Cited

U.S. PATENT DOCUMENTS

| | | | |
|---|---|---|---|
| 7,186,781 B2 | 3/2007 | Yamamoto | |
| 7,889,413 B1 * | 2/2011 | Cook | G02F 1/07 |
| | | | 359/245 |

(Continued)

FOREIGN PATENT DOCUMENTS

| | | |
|---|---|---|
| JP | 10333195 A | 12/1998 |
| KR | 20030070958 A | 9/2003 |

(Continued)

OTHER PUBLICATIONS

Gubler, et al., "Monolithic Photorefractive Organic Glasses with Large Coupling Gain and Strong Beam Fanning", Advanced. Materials. 2002, 14, No. 4, Feb. 19, Wiley-VCH Verlag GmbH, D-69469 Weinheim, 2002, pp. 313-317.

(Continued)

*Primary Examiner* — Stephone B Allen
*Assistant Examiner* — Brandi Thomas
(74) *Attorney, Agent, or Firm* — Sughrue Mion, PLLC

(57) ABSTRACT

Provided are an islands-in-sea type photorefractive polymer composite, and a photorefractive device and an optical device including the same. The islands-in-sea type photorefractive polymer composite includes at least a photoconductive polymer matrix, a nonlinear optical chromophore, and a plasticizer, as a sea component, and includes at least a photocharge generator as an island component.

13 Claims, 4 Drawing Sheets

(51) Int. Cl.
*G02F 1/03* (2006.01)
*G02F 1/35* (2006.01)
*G02F 1/361* (2006.01)
*G02B 1/04* (2006.01)

(56) References Cited

U.S. PATENT DOCUMENTS

| | | | |
|---|---|---|---|
| 2009/0092746 A1* | 4/2009 | Gu et al. | 427/74 |
| 2010/0096603 A1* | 4/2010 | Wang et al. | 252/587 |
| 2011/0262845 A1 | 10/2011 | Gu et al. | |
| 2012/0058418 A1 | 3/2012 | Wang et al. | |
| 2013/0148180 A1* | 6/2013 | Hwang et al. | 359/11 |
| 2014/0133000 A1 | 5/2014 | Choi et al. | |

FOREIGN PATENT DOCUMENTS

| | | |
|---|---|---|
| KR | 10-0432147 B1 | 5/2004 |
| KR | 10-0466249 B1 | 1/2005 |
| KR | 10-0471399 B1 | 3/2005 |
| KR | 10-0481315 B1 | 4/2005 |
| KR | 10-0531034 A | 11/2005 |
| KR | 10-1007424 B1 | 1/2011 |

OTHER PUBLICATIONS

Choi, et al., "New Photorefractive Polymer Composites Doped with Liquid Nonlinear Optical Chromophores", Macromolecular Research, vol. 17, No. 11, 2009, pp. 874-878.

Choi, et al., "High-performance photorefractive organic glass based on diphenylhydrazone", Applied Physics Letters 94, 053302 (2009), http://dx.doi.org/10.1063/1.3077156, AIP Publishing LLC., Total 4 pages.

Chun, et al., "The effect of the molecular structure of the chromophore on the photorefractive properties of the polymer systems with low glass transition temperatures", Journal of Materials Chemistry 2002, 12, pp. 858-862, The Royal Society of Chemistry 2002.

* cited by examiner

ISLANDS-IN-SEA TYPE PHOTOREFRACTIVE POLYMER COMPOSITE, AND PHOTOREFRACTIVE DEVICE AND OPTICAL DEVICE INCLUDING THE SAME

CROSS-REFERENCE TO RELATED APPLICATION

This application claims the benefit of Korean Patent Application No. 10-2013-0023944, filed on Mar. 6, 2013, in the Korean Intellectual Property Office, the disclosure of which is incorporated herein in its entirety by reference.

BACKGROUND

1. Field

Apparatuses consistent with exemplary embodiments relate to islands-in-sea type photorefractive polymer composites, and photorefractive devices and optical devices including the same, and more particularly, to islands-in-sea type photorefractive polymer composites including a sea component and an island component, and photorefractive devices and optical devices including the same.

2. Description of the Related Art

A beam fanning effect may be disadvantageous in hologram displays, but may be suitable for a light shielding device, self-phase conjugation, optical limiting for sensor protection, double phase conjugation, and a locking laser.

Therefore, there is a need to develop a new photorefractive device exhibiting a controlled beam fanning effect.

SUMMARY

One or more exemplary embodiments may provide islands-in-sea type photorefractive polymer composites including a sea component and an island component.

One or more exemplary embodiments may provide photorefractive devices including the islands-in-sea type photorefractive polymer composites.

One or more exemplary embodiments may provide optical devices including the islands-in-sea type photorefractive polymer composites.

Additional aspects will be set forth in part in the description which follows and, in part, will be apparent from the description, or may be learned by practice of the presented embodiments.

According to an aspect of an exemplary embodiment, an islands-in-sea type photorefractive polymer composite includes: at least a photoconductive polymer matrix, a nonlinear optical chromophore, and a plasticizer, as a sea component; and at least a photocharge generator as an island component.

An average particle diameter of the island component may be in a range of about 0.01 µm to about 50 µm.

The photoconductive polymer matrix may include polyvinylcarbazole (PVK), polysiloxane carbazole, polysiloxane benzocarbazole, polyparaphenylenevinylene, polyaniline, polypyrrole, polyacetylene, polythiophene, polyalkylthiophene, carbazole-substituted polysiloxane (PSX-Cz), poly(p-phenylene terephthalate) carbazole (PPT-CZ), polyacrylate triphenylamine (TATPD), a derivative thereof, a mixture thereof, or a copolymer thereof.

A weight-average molecular weight of the photoconductive polymer matrix may be in a range of about 5,000 to about 500,000.

A content of the photoconductive polymer matrix may be in a range of about 30 parts by weight to about 60 parts by weight based on 100 parts by weight of the islands-in-sea type photorefractive polymer composite.

The nonlinear optical chromophore may include 2-[3-[(E)-2-(piperidino)-1-ethenyl]-5,5-dimethyl-2-cyclohexenyliden] malononitrile (P-IP-DC), 2-{3-[(E)-2-(dibutylamino)-1-ethenyl]-5,5-dimethyl-2-cyclohexenyliden} malononitrile (DB-IP-DC), dicyanostyrene derivative 4-piperidinobenzylidene-malonitrile (PDCST), 2,5-dimethyl-4-(p-phenylazo)anisole (DMNPAA), 4-di(2-methoxyethyl) aminobenzylidene malononitrile (AODCST), 3-(N,N-di-n-butylaniline-4-yl)-1-dicyanomethylidene-2-cyclohexene (DBDC), 2-dicyanomethylene-3-cyano-2,5-dihydrofuran (DCDHF), 2,N,N-dihexylamino-7-dicyanomethylidenyl-3,4,5,6,10-pentahydronaphthalene (DHADC-MPN), aminothienyl-dioxocyano-pyridine (ATOP), 3-(2-(4-(N,N-diethylamino)phenyl)ethenyl)-5,5-dimethyl-1,2-cyclohexenylidene)propanedinitrile (Lemke-E), 1-n-butoxyl-2,5-dimethyl-4-(4'-nitrophenylazo)benzene (BDMNPAB), fluorinated cyano-tolane chromophore (FTCN), diethylamino-nitrostyrene (DEANST), or a combination thereof.

A content of the nonlinear optical chromophore may be in a range of about 50 parts by weight to about 90 parts by weight based on 100 parts by weight of the photoconductive polymer matrix.

The plasticizer may include benzyl butyl phthalate (BBP), diphenyl phthalate (DPP), di-2-ethylhexyl phthalate (DOP), N-ethylcarbazole (ECZ), n-(2-ethylhexyl)-n-(3-methylphenyl)-aniline (EHMPA), dimethylphthalate (DMP), diethylphthalate (DEP), diisobutylphthalate (DIBP), dibutylphtalate (DBP), diheptylphtalate (DHP), dioctyl phthalate (DIOP), di-n-octyl phthalate (DnOP), dinonylphthalate (DNP), diisodecylphthalate (DIDP), ditridecylphthalate (DTDP), dicyclohexyl phthalate (DCHP), butyllauryl phthalate (BLP), dioctyl adipate (DOA), diisodecyl adipate (DIDA), dioctyl azelate (DOZ), dibutyl sebacate (DBS), dioctyl sebacate (DOS), dioctyl terephthalate (DOTP), diethylene glycol dibenzoate (DEDB), butyl oleate (BO), tricresyl phosphate (TCP), trioctyl phosphate (TOP), triphenyl phosphate (TPP), trichloroethyl phosphate (TCEP), or a combination thereof.

A content of the plasticizer may be in a range of about 25 parts by weight to about 45 parts by weight based on 100 parts by weight of the photoconductive polymer matrix.

The photocharge generator may have a property of forming the island component by being separately agglomerated from the photoconductive polymer matrix when the photocharge generator is dried after being dissolved in a solvent with the photoconductive polymer matrix.

The photocharge generator may include 2,4,7-trinitrofluorenone (TNF), C60 fullerene, phenyl-C61-butyric acid methyl ester (PCBM), 2,4,7-trinitro-9-fluorenylidene-malononitrile (TNFDM), graphite, graphene, graphene oxide (GO), reduced graphene oxide (RGO), or a combination thereof.

A content of the photocharge generator may be in a range of about 0.1 parts by weight to about 1.5 parts by weight based on 100 parts by weight of the photoconductive polymer matrix.

According to an aspect of another exemplary embodiment, a photorefractive device includes: a first electrode; a second electrode disposed to face the first electrode; and the islands-in-sea type photorefractive polymer composite disposed between the first electrode and the second electrode.

According to an aspect another exemplary embodiment, an optical device includes the islands-in-sea type photorefractive polymer composite.

BRIEF DESCRIPTION OF THE DRAWINGS

These and/or other exemplary aspects and advantages will become apparent and more readily appreciated from the following description of embodiments, taken in conjunction with the accompanying drawings in which.

DETAILED DESCRIPTION

Figure 1:
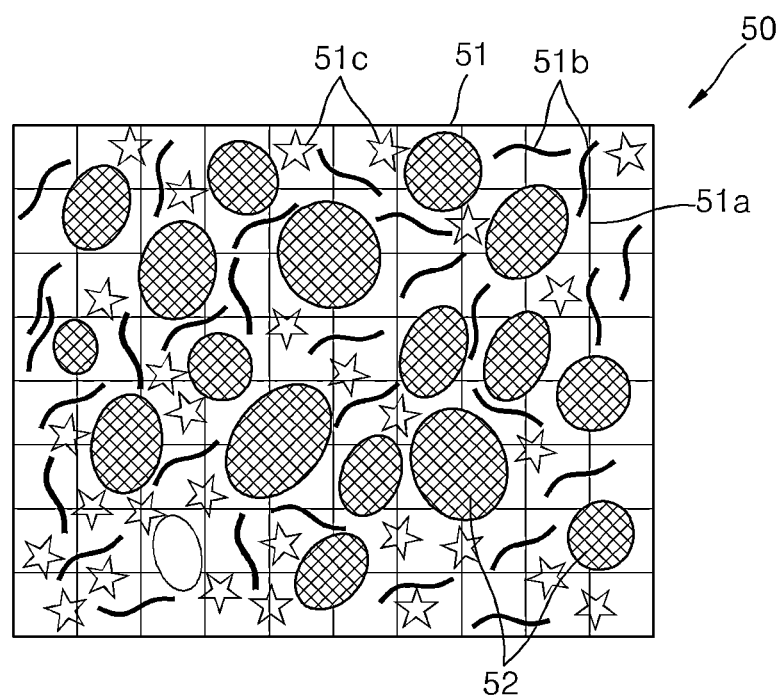
FIG. 1 is a schematic view illustrating an islands-in-sea type photorefractive polymer composite according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the embodiments are merely described below, by referring to the figures, to explain aspects of the present description.

Hereinafter, an islands-in-sea type photorefractive polymer composite according to an exemplary embodiment will be described in detail with reference to the accompanying drawings.

FIG. 1 is a schematic view illustrating an islands-in-sea type photorefractive polymer composite 50 according to an exemplary embodiment.

The islands-in-sea type photorefractive polymer composite 50 includes at least a photoconductive polymer matrix 51a, a nonlinear optical chromophore 51b, and a plasticizer 51c, as a sea component 51, and includes at least a photocharge generator or a photosensitizer, as an island component 52. The islands-in-sea type photorefractive polymer composite 50 transmits almost all incident light, in a case where an internal electric field is absent. In a case where an internal electric field is present, the islands-in-sea type photorefractive polymer composite 50 exhibits a beam fanning effect, which refers to the transmission of a portion of the incident light and the scattering of the remainder of the incident light. It is estimated that such a beam fanning effect occurs due to the existence of a charge imbalance between the sea component 51 and the island component 52 (i.e., the island component 52 has a larger amount of electrons than the sea component 51). Specifically, the charge imbalance manifests as a difference in the refractive index between the sea component 51 and the island component 52 when the nonlinear optical chromophore 51b is activated by the internal electric field, and thus, a beam fanning effect may be exhibited. FIG. 1 illustrates a case in which the island component 52 is only formed of the photocharge generator.

The sea component 51 may further include one or more photocharge generators (not shown).

The nonlinear optical chromophore 51b and the plasticizer 51c may be dispersed in the photoconductive polymer matrix 51a.

An average particle diameter of the island component 52 may be in a range of about 0.01 μm to about 50 μm, and for example, may be in a range of about 0.5 μm to about 30 μm. In a case where the average particle diameter of the island component 52 is with the above range (about 0.01 μm to about 50 μm), a photorefractive device (100 in FIG. 2) having an excellent beam fanning effect may be obtained.

The photoconductive polymer matrix 51a is a material in which electrical conductivity thereof is improved when it absorbs electromagnetic radiation. The electromagnetic radiation may include visible light, ultraviolet (UV) light, and infrared light. The photoconductive polymer matrix 51a may move charges generated by light irradiation in the islands-in-sea type photorefractive polymer composite 50 to change a spatial ratio between holes and electrons, and thus, an electric field may be induced in the islands-in-sea type photorefractive polymer composite 50.

The photoconductive polymer matrix 51a may include polyvinylcarbazole (PVK), polysiloxane carbazole, polysiloxane benzocarbazole, polyparaphenylenevinylene, polyaniline, polypyrrole, polyacetylene, polythiophene, polyalkylthiophene, carbazole-substituted polysiloxane (PSX-Cz), poly(p-phenylene terephthalate) carbazole (PPT-CZ), polyacrylate triphenylamine (TATPD), a derivative thereof, a mixture thereof, or a copolymer thereof. However, the photoconductive polymer matrix 51a is not limited thereto.

A weight-average molecular weight of the photoconductive polymer matrix 51a may be in a range of about 5,000 to about 500,000, and for example, may be in a range of about 10,000 to about 20,000. In a case where the weight-average molecular weight of the photoconductive polymer matrix 51a is within the above range (about 5,000 to about 500,000), a photorefractive device (100 in FIG. 2) may be obtained, in which breakdown may not occur during the application of an electrical field thereto due to high electrical stability, and solubility of the photoconductive polymer matrix 51a with respect to a solvent is suitable for preparing the photorefractive device (100 in FIG. 2).

The content of the photoconductive polymer matrix 51a may be in a range of about 30 parts by weight to about 60 parts by weight based on 100 parts by weight of the islands-in-sea type photorefractive polymer composite 50, and for example, may be in a range of about 45 parts by weight to about 55 parts by weight. In a case where the content of the photoconductive polymer matrix 51a is within the above range (about 30 parts by weight to about 60 parts by weight), a photorefractive device (100 in FIG. 2) may be obtained, in which an applied voltage at which a maximum diffraction efficiency occurs may be decreased because a magnitude of an internal space-charge field is large due to high photoconductivity, and a photorefractive phenomenon may be exhibited even at room temperature (about 25° C.).

The nonlinear optical chromophore 51b is activated by the electric field induced in the photorefractive polymer composite 50 to thus manifest the difference in a spatial refractive index. That is, the nonlinear optical chromophore 51b is primarily arranged by an electric field applied from the outside and rearranged by the internal space-charge field generated by photoconductivity.

The nonlinear optical chromophore 51b may include 2-[3-[(E)-2-(piperidino)-1-ethenyl]-5,5-dimethyl-2-cyclohexenyliden] malononitrile (P-IP-DC), 2-{3-[(E)-2-(dibutylamino)-1-ethenyl]-5,5-dimethyl-2-cyclohexenyliden} malononitrile (DB-IP-DC), dicyanostyrene derivative 4-piperidinobenzylidene-malononitrile (PDCST), 2,5-dimethyl-4-(p-phenylazo)anisole (DMNPAA), 4-di(2-methoxyethyl) aminobenzylidene malononitrile (AODCST), 3-(N,N-di-n-butylaniline-4-yl)-1-dicyanomethylidene-2-cyclohexene (DBDC), 2-dicyanomethylene-3-cyano-2,5-dihydrofuran (DCDHF), 2,N,N-dihexylamino-7-dicyanomethylidenyl-3,4,5,6,10-pentahydronaphthalene (DHADC-MPN), aminothienyl-dioxocyano-pyridine (ATOP), 3-(2-(4-(N,N-diethylamino)phenyl)ethenyl)-5,5-dimethyl-1,2-cyclohexenylidene)propanedinitrile (Lemke-E), 1-n-butoxyl-2,5-dimethyl-4-(4'-nitrophenylazo) benzene (BDMNPAB), fluorinated cyano-tolane chromophore (FTCN), diethylamino-nitrostyrene (DEANST), or a combination thereof. However, the nonlinear optical chromophore 51b is not limited thereto.

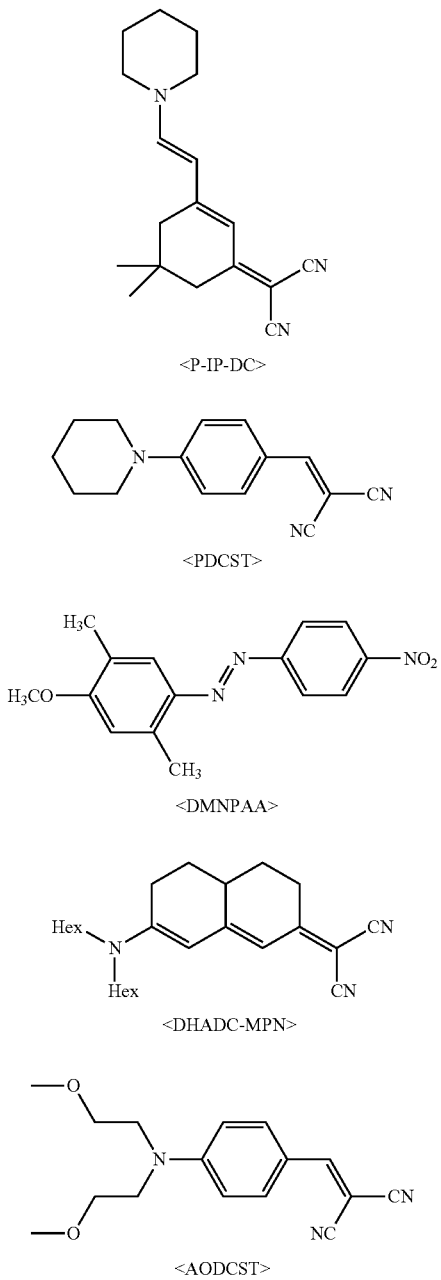

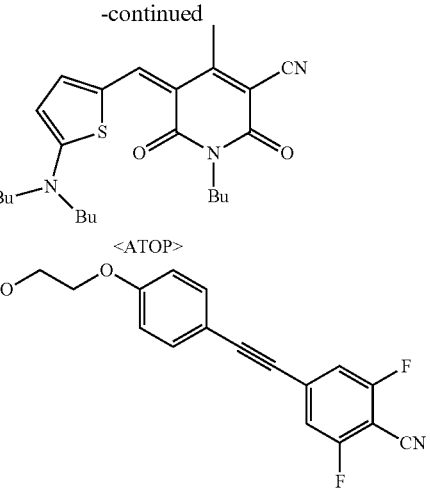

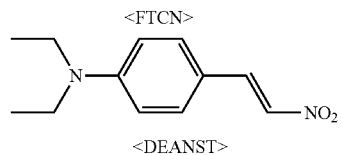

A content of the nonlinear optical chromophore 51b is in a range of about 50 parts by weight to about 90 parts by weight based on 100 parts by weight of the photoconductive polymer matrix 51a, and for example, may be in a range of about 50 parts by weight to about 60 parts by weight. In a case where the content of the nonlinear optical chromophore 51b is within the above range (about 50 parts by weight to about 90 parts by weight), a photorefractive device (100 in FIG. 2) may be obtained, which may exhibit a high birefringence even at a low applied voltage, may be easily prepared because particles of the nonlinear optical chromophore 51b are not agglomerated, and may have high electrical stability.

The plasticizer 51c may decrease the glass transition temperature of the islands-in-sea type photorefractive polymer composite 50 to increase degrees of freedom of the islands-in-sea type photorefractive polymer composite materials and thus, the plasticizer 51c may improve the photorefractive efficiency by an orientational enhancement effect.

The plasticizer 51c may include benzyl butyl phthalate (BBP), diphenyl phthalate (DPP), di-2-ethylhexyl phthalate (DOP), N-ethylcarbazole (ECZ), n-(2-ethylhexyl)-n-(3-methylphenyl)-aniline (EHMPA), dimethylphthalate (DMP), diethylphthalate (DEP), diisobutylphtalate (DIBP), dibutylphtalate (DBP), diheptylphtalate (DHP), dioctyl phthalate (DIOP), di-n-octyl phthalate (DnOP), dinonylphthalate (DNP), diisodecylphthalate (DIDP), ditridecylphthalate (DTDP), dicyclohexyl phthalate (DCHP), butyllauryl phthalate (BLP), dioctyl adipate (DOA), diisodecyl adipate (DIDA), dioctyl azelate (DOZ), dibutyl sebacate (DBS), dioctyl sebacate (DOS), dioctyl terephthalate (DOTP), diethylene glycol dibenzoate (DEDB), butyl oleate (BO), tricresyl phosphate (TCP), trioctyl phosphate (TOP), triphenyl phosphate (TPP), trichloroethyl phosphate (TCEP), or a combination thereof. However, the plasticizer 51c is not limited thereto.

A content of the plasticizer 51c may be in a range of about 25 parts by weight to about 45 parts by weight based on 100 parts by weight of the photoconductive polymer matrix 51a.

In a case where the content of the plasticizer 51c is within the above range, a photorefractive device (100 in FIG. 2) may be obtained, which may exhibit a photorefractive phenomenon even at room temperature (about 25° C.) and maintain high electrical stability even during the application of a high voltage thereto.

The photocharge generator (not shown) may be excited by a light source having a particular wavelength range, for example, visible light, to generate electrons and holes.

The photocharge generator may have the property of forming the island component 52 by separating from the photoconductive polymer matrix 51a and being agglomerated when the photocharge generator is dried after being dissolved in a solvent with the photoconductive polymer matrix 51a. As a result, a predetermined combination of the photoconductive polymer matrix 51a and the photocharge generator, capable of forming the islands-in-sea type photorefractive polymer composite 50 may exist. For example, a combination of PVK and graphene oxide (GO) may form the islands-in-sea type photorefractive polymer composite 50.

The islands-in-sea type photorefractive polymer composite 50 may further include a co-photocharge generator (not shown) in addition to the photocharge generator. The co-photocharge generator may not be agglomerated by itself and may be dried in a state of being dispersed in the photoconductive polymer matrix 51a when the co-photocharge generator is dried after being dissolved in a solvent with the photoconductive polymer matrix 51a. As a result, the co-photocharge generator may be dispersed in the photoconductive polymer matrix 51a in the islands-in-sea type photorefractive polymer composite 50.

The solvent may include toluene, dimethylformamide (DMF), or a mixture thereof. However, the solvent is not limited thereto.

The photocharge generator and the co-photocharge generator may each independently include 2,4,7-trinitrofluorenone (TNF), C60 fullerene, phenyl-C61-butyric acid methyl ester (PCBM), 2,4,7-trinitro-9-fluorenylidene-malononitrile (TNFDM), graphite, graphene, GO, reduced graphene oxide (RGO), or a combination thereof. However, the photocharge generator and the co-photocharge generator are not limited thereto. The photocharge generator and the co-photocharge generator are not the same as each other.

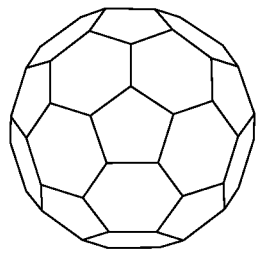

<C60 fullerene>

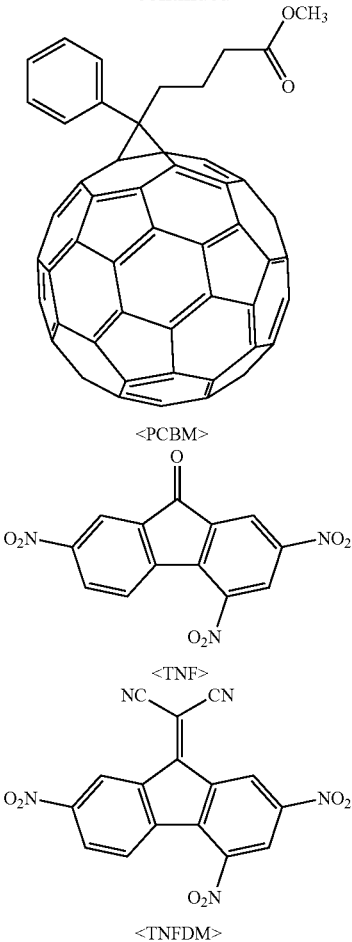

<PCBM>

<TNF>

<TNFDM>

The content of oxygen in the graphene oxide may be in a range of about 5 wt % to about 30 wt %.

The content of oxygen in the reduced graphene oxide may be in a range of about 1 wt % to about 5 wt %.

The content of the photocharge generator may be in a range of about 0.1 parts by weight to about 1.5 parts by weight based on 100 parts by weight of the photoconductive polymer matrix 51a. In a case where the content of the photocharge generator is within the above range, a photorefractive device (100 in FIG. 2) having excellent photorefractive characteristics and electrical stability as well as exhibiting an excellent beam fanning effect may be obtained.

Hereinafter, a photorefractive device according to an exemplary embodiment will be described in detail with reference to the accompanying drawings.

Figure 2:
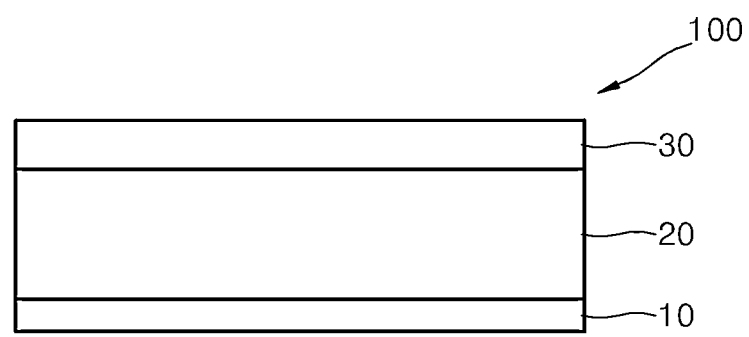
FIG. 2 is a schematic view illustrating a photorefractive device according to an exemplary embodiment.

FIG. 2 is a schematic view illustrating a photorefractive device 100 according to the current exemplary embodiment.

Referring to FIG. 2, the photorefractive device 100 according to an exemplary embodiment includes a first electrode 10, a second electrode 30 disposed opposite the first electrode 10, and a photorefractive layer 20 disposed between the first electrode 10 and the second electrode 30. The first electrode 10 may include a material such as gold (Au), aluminum (Al), indium tin oxide (ITO), and indium zinc oxide (IZO). However, the material included in the first electrode 10 is not limited thereto. The second electrode 30 may include the same material as the first electrode 10, or a different material.

The photorefractive layer 20 may include an islands-in-sea type photorefractive polymer composite, as described above.

When the photorefractive layer 20 is irradiated with coherent light having the same wavelength, an internal electric field is generated while charges are generated and move in a portion in which constructive interference occurs. A nonlinear optical chromophore in the photorefractive polymer composite is activated by the internal electric field to manifest the difference in a spatial refractive index in the photorefractive layer 20. Therefore, a beam fanning effect may be manifested when the light is incident on the photorefractive device 100.

The photorefractive device 100 may be used in an apparatus using a beam fanning effect.

Hereinafter, a beam fanning effect of the photorefractive device 100 according to an exemplary embodiment will be described in detail with reference to FIG. 3.

Figure 3:
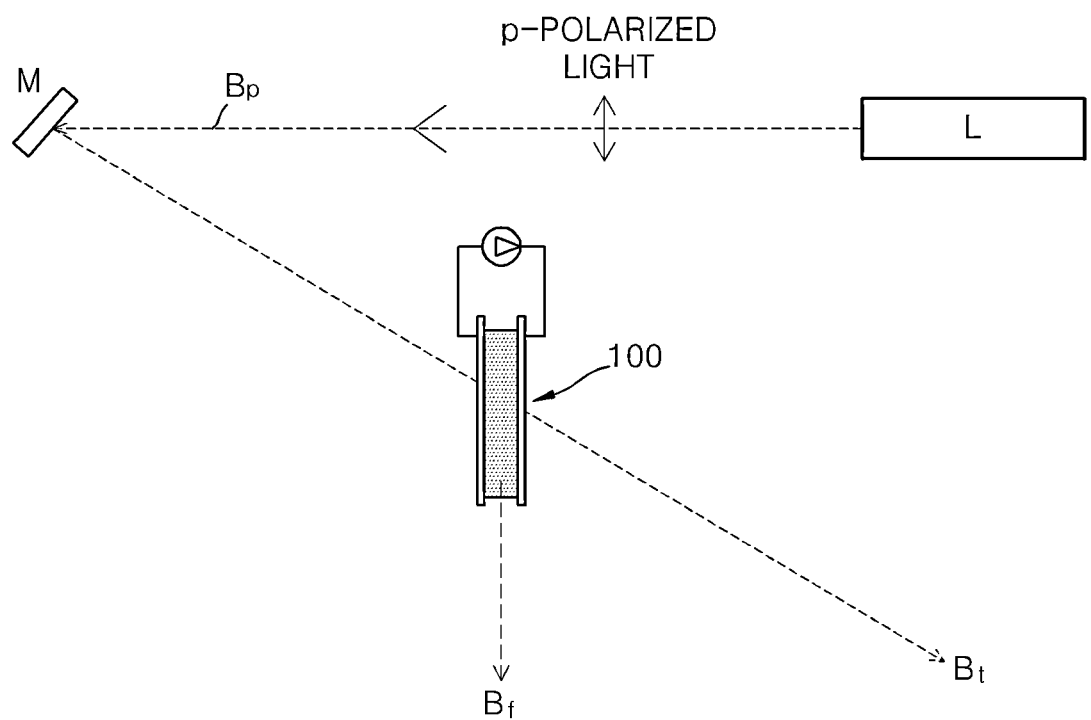
FIG. 3 is a schematic view illustrating an apparatus measuring a beam fanning effect of the photorefractive device of FIG. 2.

FIG. 3 is a schematic view illustrating an apparatus measuring a beam fanning effect of the photorefractive device 100 in FIG. 2.

Referring to FIG. 3, in a case where an internal electric field is generated when a voltage is applied to the photorefractive device 100, a p-polarized pump beam ($B_p$) released from a laser light source L is incident on the photorefractive device 100, reflected via a minor M, and is separated into a transmittance beam ($B_t$) and a fanning beam ($B_f$) by the photorefractive device 100. In this case, the phenomenon, in which the incident light (i.e., $B_p$) is separated into the $B_t$ and the $B_f$, is one type of a beam fanning effect, as discussed above.

The foregoing islands-in-sea type photorefractive polymer composite may not only be used in the photorefractive device 100 described above, but may also be used in any of other various types of optical devices.

The optical device may be a light shielding device; a device using self-phase conjugation, optical limiting for sensor protection, or double conjugation; or a locking laser.

Hereinafter, additional exemplary embodiments will be described. However, these examples are not limiting.

EXAMPLES

Preparation Example 1

Synthesis of Graphene Oxide (GO)

Graphite was acid-treated by using the Hummers method as follows. First, about 1 g of graphite was dispersed in sulfuric acid at about 0° C. to prepare a graphite dispersion, and about 2 g of sodium acetate was then added to the graphite dispersion and dissolved for about 10 minutes. Thereafter, about 12 g of potassium permanganate was further added to the graphite dispersion and dissolved for about 10 minutes. Then, an oxidation reaction of graphite was performed at room temperature (about 25° C.) for about 12 hours. After completion of the oxidation reaction, the product was added to about 2 L of distilled water and stirred. Then, about 20 mL of hydrogen peroxide was further added to remove potassium permanganate. As a result, a GO dispersion was obtained. Subsequently, the GO dispersion was separated into distilled water and GO by using a centrifuge. The separated GO was washed several times to be neutralized to a pH level ranging from about 6 to about 7 and then dried with a freeze dryer to obtain GO (oxygen content: about 28.6 wt %).

Example 1

Preparation of Islands-in-sea Type Photorefractive Polymer Composite and Photorefractive Device In Example 1, PVK (weight-average molecular weight=about 23,000) was used as a photoconductive polymer, dicyanostyrene derivative 4-piperidinobenzylidenemalonitrile (PDCST) was used as a nonlinear optical chromophore, N-ethylcarbazole (ECZ) was used as a plasticizer, and the GO prepared in Preparation Example 1 was used as a photocharge generator.

First, about 0.05 mg of GO was added to about 0.5 mL of dimethylformamide (DMF) and the GO was dissolved with a sonicator. Then, about 49.5 mg of the photoconductive polymer, about 30 mg of the nonlinear optical chromophore, and about 20 mg of the plasticizer were further added thereto and dispersed to obtain a coating composition. The coating composition was dropped on an ITO-coated glass substrate that had been heated to have a temperature of about 60° C. through a filter membrane (average pore diameter: about 0.2 μm). The ITO-coated glass substrate coated with the composition was put in a vacuum oven (about 0.01 mmHg) at about 60° C. and the solvent (DMF) was removed from the composition for about 12 hours to obtain an islands-in-sea type photorefractive polymer composite precursor film. Two Teflon spacers (thickness of about 100 μm) were disposed at both sides of the islands-in-sea type photorefractive polymer composite precursor film, respectively, and a second ITO-coated glass substrate was used to cover the spacers. The islands-in-sea type photorefractive polymer composite precursor film disposed between two ITO-coated glass substrates was softened on a hot plate at about 120° C. for about 5 minutes to obtain a photorefractive device composed of two ITO-coated glass substrates and an islands-in-sea type photorefractive polymer composite disposed therebetween. Thereafter, in order to increase the thickness uniformity of the photorefractive device, the photorefractive device was maintained in an oven at about 120° C. for about 10 minutes and then rapidly cooled using dry ice.

Example 2

Preparation of Islands-in-sea Type Photorefractive Polymer Composite and Photorefractive Device An islands-in-sea type photorefractive polymer composite and a photorefractive device were prepared in the same manner as Example 1 except that a content of GO, as a photocharge generator, was changed to about 0.5 mg.

Comparative Example 1

Preparation of Photorefractive Polymer Composite and Photorefractive Device

A photorefractive polymer composite and a photorefractive device were prepared in the same manner as Example 1 except that $C_{60}$ fullerene (379646, Aldrich Buckminsterfullerene) instead of GO was used as a photocharge generator.

Compositions and glass transition temperatures ($T_g$) of the photorefractive polymer composites of Examples 1 and 2 and Comparative Example 1 are summarized in Table 1 below.

TABLE 1

| Item | Photoconductive polymer and content thereof (mg) | Nonlinear optical chromophore and content thereof (mg) | Plasticizer and content thereof (mg) | Photocharge generator and content thereof (mg) | Glass transition temperature ($T_g$) of photoconductive polymer composite (° C.) |
|---|---|---|---|---|---|
| Example 1 | PVK: 49.5 | PDCST: 30 | ECZ: 20 | GO: 0.05 | 31 |
| Example 2 | PVK: 49.5 | PDCST: 30 | ECZ: 20 | GO: 0.5 | 33 |
| Comparative Example 1 | PVK: 49.5 | PDCST: 30 | ECZ: 20 | $C_{60}$ fullerene: 0.5 | 31 |

In Table 1, the glass transition temperatures were measured at a rate of 10° C./min by differential scanning calorimetry (DSC), model Q100 by TA instruments.

Evaluation Example

Phase stabilities of the photorefractive polymer composites prepared in Examples 1 and 2 and Comparative Example 1 were evaluated by the following method and the results thereof are presented in Table 2 below. Also, photoconductivities, gain factors, and beam fanning effects of the photorefractive devices prepared in Examples 1 and 2 and Comparative Example 1 were evaluated by the following method and the results thereof are presented in Table 2 below. Furthermore, average particle diameters of island components in the islands-in-sea type photorefractive polymer composites prepared in Examples 1 and 2 were evaluated by the following method and the results thereof are presented in Table 2 below.

(Average Particle Diameter of Island Component)

A particle diameter of an island component of each islands-in-sea type photorefractive polymer composite was measured using an Upright Microscope Eclipse L200 by Nikon.

(Evaluation of Phase Stability of Photorefractive Polymer Composite)

Whether phase separation occurred when each photorefractive polymer composite had been left standing in an oven at about 60° C. for about 1 month was observed. When the phase separation did not occur for about 1 month, the result was evaluated as "excellent," and when a change in transmittance of a He—Ne laser beam for one month with respect to an initial transmittance thereof was about 20% or less, the result was evaluated as "good".

(Evaluation of Photoconductivity)

In a photorefractive material, formation of a space-charge field according to an intensity of light inside the material is required to manifest photorefractivity. Magnitude and formation speed of the internal space-charge field mainly depend on photoconductivity. Herein, the photoconductivity is affected by an amount of generated photocharge and mobility of photocharge. The photoconductivity was measured as follows: about 5,000 V of a direct voltage was applied to a photorefractive device (thickness of about 100 µm) under standard conditions (1 atm, 25° C.), and a current per unit area of the photorefractive device was then measured by using a He—Ne laser with a wavelength of about 633 nm and an intensity of 10 mW/cm².

(Gain Factor (Two-Beam Coupling (2BC)) Measurement)

The rearrangement of the nonlinear optical chromophore occurs according to the formation of the internal space-charge field, and as a result, a spatial refractive index of the photorefractive device is modulated. With respect to the photorefractive phenomenon, changes in the refractive index induced by light do not match the distribution of light, and thus, a spatially shifted phase difference occurs. Due to the phase difference, an energy transition phenomenon occurs between two laser beams incident on a photorefractive material. That is, the energy of one beam is transitioned to the other beam. An intensity ($\gamma$) of energy transition between two beams may be measured by irradiating two p-polarized beams ($I_1$, $I_2$) to a sample and measuring intensities of transmitted beams: $\gamma=[I_{1(I2\neq 0)}/I_{1(I2=0)}]$, wherein $I_{1(I2=0)}$ is an intensity of $I_1$ transmitted through the sample when $I_2$ is not incident, and $I_{1(I2\neq 0)}$ is an intensity of $I_1$ transmitted through the sample when $I_2$ is incident. A gain factor ($\Gamma$) is calculated by the following equation: $\Gamma=[\ln(\gamma\cdot\beta)-\ln(1+\beta-\gamma)]/L$, wherein $\beta=(I_2/I_1)d$, L is a length of optical path, and d is a thickness of the sample. Herein, the gain factor is measured by using a measurement method disclosed in "Appl. Phys. Lett. 94, 053302 (2009), J. Mater. Chem. 12, 858 (2002)".

(Measurement of Beam Fanning Effect)

A beam fanning effect of each photorefractive device was measured by using a beam fanning effect measurement apparatus (made in-house) having the same configuration as FIG. 3.

TABLE 2

| Item | Average particle diameter of island component (µm) | Phase stability | Photoconductivity, @50 V/µm [nA] | Gain factor, @80 V/µm [cm$^{-1}$] | Presence of beam fanning effect and efficiency*[1] (@50 V/µm) |
|---|---|---|---|---|---|
| Example 1 | 20 | Excellent | 50 | −50 | Present/80% |
| Example 1 | 25 | Good | 250 | −5 | Present/60% |
| Comparative Example 1 | — | Excellent | 0 | 0 | Absent/about 0% |

*[1]Beam fanning efficiency (%) = (intensity of a fanning beam when reaching a steady state after application of voltage)/(strength of a transmittance beam without application of voltage) × 100

Referring to Table 2, the photorefractive polymer composites prepared in Examples 1 and 2 had an islands-in-sea type structure, but the photorefractive polymer composite prepared in Comparative Example 1 did not have an islands-in-sea type structure. Also, the photorefractive devices prepared in Examples 1 and 2 exhibited a beam fanning effect, but the photorefractive device prepared in Comparative Example 1 did not exhibit a beam fanning effect. It was found that the photorefractive devices prepared in Examples 1 and 2 had higher photoconductivities and gain factors than those of the photorefractive device prepared in Comparative Example 1.

Figure 4:
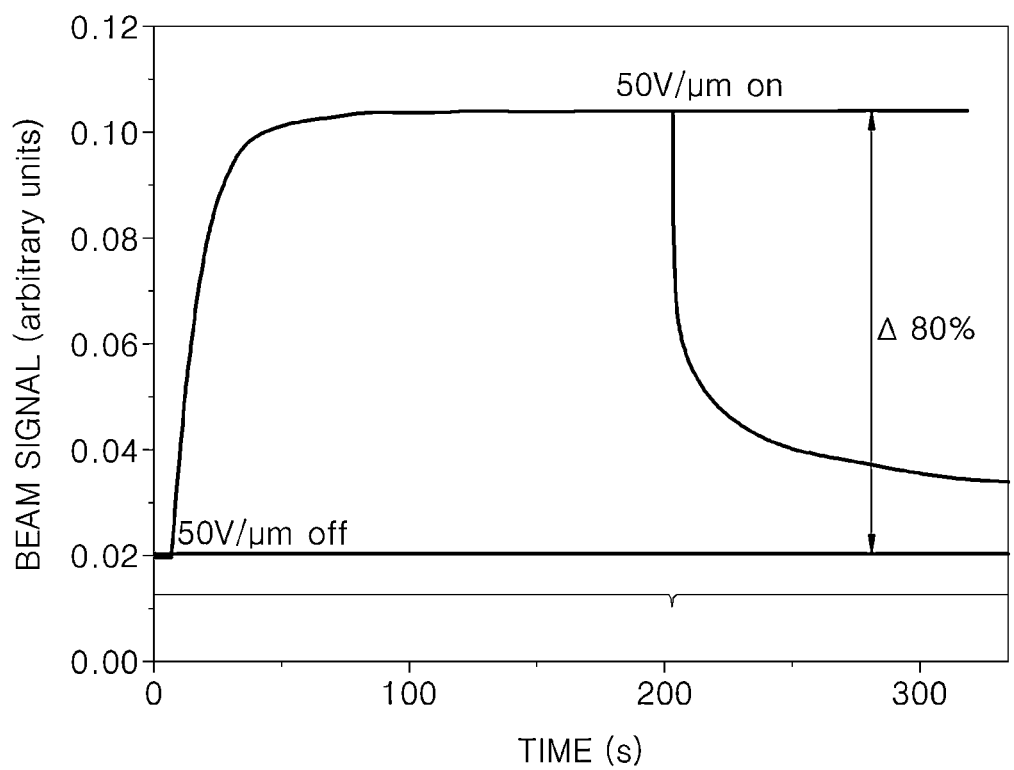
FIG. 4 is a graph illustrating a beam fanning effect of a photorefractive device prepared in Example 1.

Furthermore, measurement results of the beam fanning effect of the photorefractive device prepared in Example 1 are illustrated in a graph of FIG. 4. Referring to FIG. 4, the photorefractive device prepared in Example 1 transmitted almost all incident light in a state of having no voltage applied thereto. However, after the application of voltage, the photorefractive device prepared in Example 1 did not transmit, but scattered about 80% of the incident light based upon reaching a steady state.

Figure 5:
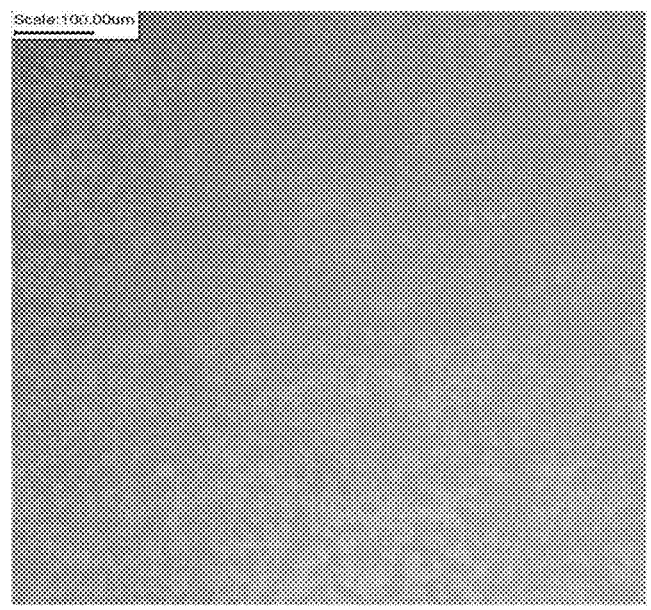
FIG. 5 is a micrograph of the photorefractive device prepared in Example 1.

Also, micrographs were taken from the islands-in-sea type photorefractive polymer composite prepared in Example 1 and the results thereof are presented in FIG. 5.

Referring to FIG. 5, it may be confirmed that the islands-in-sea type photorefractive polymer composite prepared in Example 1 includes a sea component (white portions) and an island component (black portions).

Since the islands-in-sea type photorefractive polymer composite according to the embodiment of the present invention includes a sea component and an island component, the islands-in-sea type photorefractive polymer composite may exhibit a controlled beam fanning effect.

Furthermore, the islands-in-sea type photorefractive polymer composite according to the embodiment of the present invention may be suitable for a light shielding device, self-phase conjugation, optical limiting for sensor protection, double phase conjugation, and a locking laser.

While exemplary embodiments have been particularly shown and described, it will be understood by those of ordinary skill in the art that various changes in form and details may be made therein without departing from the spirit and scope of the present invention as defined by the following claims and their equivalents.

What is claimed is:

1. An islands-in-sea type photorefractive polymer composite comprising:
a sea component comprising a photoconductive polymer matrix, a nonlinear optical chromophore, and a plasticizer; and
an island component comprising a photocharge generator;
wherein an average particle diameter of the island component is in a range of about 0.5 μm to about 50 μm;
wherein the photocharge generator is configured to be separately agglomerated from the photoconductive polymer matrix to form the island component when the photocharge generator is drive after being dissolved in a solvent with the photoconductive polymer matrix;
wherein, when an internal electric field is present in the islands-in-sea type photorefractive polymer composite, an amount of electrons in the island component is larger than an amount of electrons in the sea component; and
wherein the islands-in-sea type photorefractive polymer composite transmits substantially all incident light when an internal electric field is absent, and the islands-in-sea type photorefractive polymer composite exhibits a beam fanning effect when an internal electric field is present.

2. The islands-in-sea type photorefractive polymer composite of claim 1, wherein the photoconductive polymer matrix comprises polyvinylcarbazole (PVK), polysiloxane carbazole, polysiloxane benzocarbazole, polyparaphenylenevinylene, polyaniline, polypyrrole, polyacetylene, polythiophene, polyalkylthiophene, carbazole-substituted polysiloxane (PSX-Cz), poly(p-phenylene terephthalate) carbazole (PPT-CZ), polyacrylate triphenylamine (TATPD), a derivative thereof, a mixture thereof, or a copolymer thereof.

3. The islands-in-sea type photorefractive polymer composite of claim 1, wherein a weight-average molecular weight of the photoconductive polymer matrix is in a range of about 5,000 to about 500,000.

4. The islands-in-sea type photorefractive polymer composite of claim 1, wherein a content of the photoconductive polymer matrix is in a range of about 30 parts by weight to about 60 parts by weight based on 100 parts by weight of the islands-in-sea type photorefractive polymer composite.

5. The islands-in-sea type photorefractive polymer composite of claim 1, wherein the nonlinear optical chromophore comprises one or more of a group consisting of: 2-[3-[(E)-2-(piperidino)-1-ethenyl]-5,5-dimethyl-2-cyclohexenyliden] malononitrile (P-IP-DC), 2-{3-[(E)-2-(dibutylamino)-1-ethenyl]-5,5-dimethyl-2-cyclohexenyliden } malononitrile (DB-IP-DC), dicyanostyrene derivative 4-piperidinobenzylidene-malonitrile (PDCST), 2,5-dimethyl-4-(p-phenylazo) anisole (DMNPAA), 4-di(2-methoxyethyl) aminobenzylidene malononitrile (AODCST), 3-(N,N-di-n-butylaniline-4-yl)-1-dicyanomethylidene-2-cyclohexene (DBDC), 2-dicyanomethylene-3-cyano-2,5-dihydrofuran (DCDHF), 2,N,N-dihexylamino-7-dicyanomethylidenyl-3,4,5,6,10-pentahydronaphthalene (DHADC-MPN), aminothienyl-dioxocyano-pyridine (ATOP), 3-(2-(4-(N,N-diethylamino)phenyl)ethenyl)-5,5-dimethyl-1,2-cyclohexenylidene)propanedinitrile (Lemke-E), 1-n-butoxyl-2,5-dimethyl-4-(4'-nitrophenylazo) benzene (BDMNPAB), fluorinated cyano-tolane chromophore (FTCN), and diethylamino-nitrostyrene (DEANST).

6. The islands-in-sea type photorefractive polymer composite of claim 1, wherein a content of the nonlinear optical chromophore is in a range of about 50 parts by weight to about 90 parts by weight based on 100 parts by weight of the photoconductive polymer matrix.

7. The islands-in-sea type photorefractive polymer composite of claim 1, wherein the plasticizer comprises one or more of a group consisting of benzyl butyl phthalate (BBP), diphenyl phthalate (DPP), di-2-ethylhexyl phthalate (DOP), N-ethylcarbazole (ECZ), n-(2-ethylhexyl)-n-(3-methylphenyl)-aniline (EHMPA), dimethylphthalate (DMP), diethylphthalate (DEP), diisobutylphtalate (DIBP), dibutylphtalate (DBP), diheptylphtalate (DHP), dioctyl phthalate (DIOP), di-n-octyl phthalate (DnOP), dinonylphthalate (DNP), diisodecylphthalate (DIDP), ditridecylphthalate (DTDP), dicyclohexyl phthalate (DCHP), butyllauryl phthalate (BLP), dioctyl adipate (DOA), diisodecyl adipate (DIDA), dioctyl azelate (DOZ), dibutyl sebacate (DBS), dioctyl sebacate (DOS), dioctyl terephthalate (DOTP), diethylene glycol dibenzoate (DEDB), butyl oleate (BO), tricresyl phosphate (TCP), trioctyl phosphate (TOP), triphenyl phosphate (TPP), and trichloroethyl phosphate (TCEP),.

8. The islands-in-sea type photorefractive polymer composite of claim 1, wherein a content of the plasticizer is in a range of about 25 parts by weight to about 45 parts by weight based on 100 parts by weight of the photoconductive polymer matrix.

9. The islands-in-sea type photorefractive polymer composite of claim 1, wherein the photocharge generator comprises one or more of a group consisting of graphite, graphene, graphene oxide (GO), and reduced graphene oxide (RGO).

10. The islands-in-sea type photorefractive polymer composite of claim 1, wherein a content of the photocharge generator is in a range of about 0.1 parts by weight to about 1.5 parts by weight based on 100 parts by weight of the photoconductive polymer matrix.

11. A photorefractive device comprising:
a first electrode;
a second electrode; and
an islands-in-sea type photorefractive polymer composite disposed between the first electrode and the second electrode, the islands-in-sea type photorefractive polymer composite comprising:
a sea component comprising a photoconductive polymer matrix, a nonlinear optical chromophore, and a plasticizer; and
an island component comprising a photocharge generator;
wherein an average particle diameter of the island component is in a range of about 0.5 µm to about 50 µm;
wherein the photocharge generator is configured to be separately agglomerated from the photoconductive polymer matrix to form the island component when the photocharge generator is drive after being dissolved in a solvent with the photoconductive polymer matrix;
wherein, when an internal electric field is present in the islands-in-sea type photorefractive polymer composite, an amount of electrons in the island component is larger than an amount of electrons in the sea component; and
wherein the islands-in-sea type photorefractive polymer composite transmits substantially all incident light when an internal electric field is absent, and the islands-in-sea type photorefractive polymer composite exhibits a beam fanning effect when an internal electric field is present.

12. An optical device comprising an islands-in-sea type photorefractive polymer composite comprising:
a sea component comprising a photoconductive polymer matrix, a nonlinear optical chromophore, and a plasticizer; and
an island component comprising a photocharge generator;
wherein an average particle diameter of the island component is in a range of about 0.5 µm to about 50 µm;
wherein the photocharge generator is configured to be separately agglomerated from the photoconductive polymer matrix to form the island component when the photocharge generator is drive after being dissolved in a solvent with the photoconductive polymer matrix;
wherein, when an internal electric field is present in the islands-in-sea type photorefractive polymer composite, an amount of electrons in the island component is larger than an amount of electrons in the sea component; and
wherein the islands-in-sea type photorefractive polymer composite transmits substantially all incident light when an internal electric field is absent, and the islands-in-sea type photorefractive polymer composite exhibits a beam fanning effect when an internal electric field is present.

13. An optical beam splitter comprising:
an islands-in-sea type photorefractive polymer composite comprising:
a sea component comprising: a photoconductive polymer matrix, a nonlinear optical chromophore, and a plasticizer; and
a plurality of island components each comprising a photocharge generator;
wherein an average particle diameter of the island component is in a range of about 0.5 µm to about 50 µm;
wherein the photocharge generator is configured to be separately agglomerated from the photoconductive polymer matrix to form the island component when the photocharge generator is drive after being dissolved in a solvent with the photoconductive polymer matrix;
wherein, when an internal electric field is present in the islands-in-sea type photorefractive polymer composite, an amount of electrons in the island component is larger than an amount of electrons in the sea component; and
wherein the islands-in-sea type photorefractive polymer composite transmits substantially all incident light when an internal electric field is absent, and the islands-in-sea type photorefractive polymer composite exhibits a beam fanning effect when an internal electric field is present.

* * * * *